United States Patent Office 3,438,923
Patented Apr. 15, 1969

3,438,923
COAGULATION OF LATEX OF ACRYLO-
NITRILE AND STYRENE GRAFTED
ONTO POLYBUTADIENE
Charles W. Strobel, Bartlesville, Okla., assignor to Phillips
Petroleum Company, a corporation of Delaware
No Drawing. Filed July 18, 1966, Ser. No. 565,677
Int. Cl. C08f 47/02, 37/00
U.S. Cl. 260—29.7                                5 Claims

ABSTRACT OF THE DISCLOSURE

An ABS latex is converted to granular particles during coagulation by heating at a temperature of at least 287° F.

---

This invention relates to a method for coagulating an ABS latex. In one aspect this invention relates to a method for recovering enlarged ABS resin particles from a latex of that resin.

Heretofore ABS resins, i.e. polymers of acrylonitrile, butadiene, and styrene, were prepared by polymerizing the monomers in a conventional manner well know in the art. The resulting resin was then coagulated in another manner well known in the art such as by contacting the latex with a coagulant such as brine or an aliphatic alcohol such as isopropyl alcohol. Generally, heretofore the ABS latex was maintained at a temperature of less than 212° F. during coagulation.

Also, generally when coagulating an ABS latex in a conventional manner, the resin particles obtained from the coagulation step are powdery in nature and the powdery resin so obtained is difficult to dry or otherwise treat. The powder is also difficult to handle or convey to different treating operations.

Quite surprisingly, it has now been found that in the case of an ABS latex formed from a base latex of polybutadiene onto which is grafted acrylonitrile and styrene, granular resin particles are formed if the latex is heated during the coagulation step to a temperature of at least 287° F.

The ABS resins of this invention are useful for forming many articles such as shoe heels, boat shells, tote boxes, pipes and conduits, luggage, housings for business machines, and the like.

Accordingly, it is an object of this invention to provide a new and improved method for coagulating ABS resins. It is another object of this invention to provide a new and improved method for enlarging the particle size of ABS resins obtained from a process of coagulating a latex of those resins.

Other aspects, objects, and the several advantages of this invention will be apparent to those skilled in the art from the description and appended claims.

This invention is applicable to ABS resins formed from a base latex of polybutadiene onto which polybutadiene has been graft polymerized acrylonitrile and styrene. The method by which the ABS resin is formed can be any method known in the art. Suitable methods are disclosed in ABS Plastics by C. H. Basdekis, Reinhold Publishing Corporation, New York, 1964, the disclosure of which is hereby incorporated herein by reference. The various methods, catalysts, soaps, and the like used to make conventional ABS graft copolymers are known in the art and therefore will not be discussed in detail.

Similarly well known are the conventional methods for coagulating an ABS graft copolymer from the latex. For example, it is known that such polymers can be coagulated by treating the latex with acids, salts, and the like. As mentioned above, brine and various alcohols can be used as coagulant and combinations of materials can also be used, e.g. dilute brine and sulfuric acid.

By this invention known coagulation techniques are employed as set forth in the prior art except that substantially higher coagulation temperatures are used so that a resin product of larger particle size is obtained than was possible with previous techniques, the larger particle size product being easier to treat and handle than the powder type product normally obtained by the prior art. The granular resin product obtained by this invention will have a particle diameter of at least 840 microns which is considerably larger than the powdered resins normally obtained when not practicing this invention which has a particle size no greater than about 149 microns. By particle diameter what is meant is the diameter of the particle if substantially round or, if the particle is not substantially round, intermediate dimension of the length, width, and breadth of the particle.

The temperature of the latex during coagulation is at least 287° F., preferably in the range of from 287 to about 350° F. although temperatures higher than 350° F. can be employed if desired. The latex can be heated to at least 287° F. before, during, or after coagulation is carried out. The heating of the latex can be direct such as by introducing super-heated steam into contact with the latex or by indirect heating methods known in the art. The time for such heating can vary widely depending upon the particular latex and coagulating agents employed as well as the amounts of these agents and other coagulating assistants present and can vary from a time substantially less than the time period required for coagulating the resin up to substantially the entire time period for the coagulation operation. Generally, satisfactory results are obtained if the heating is carried out within the period of from about 1 minute to about 1 hour.

Also, less conventional coagulation techniques can be used, for example, the coagulating agent, e.g. an acid, can be added to a body of water and the latex then poured into the water-coagulant mixture after which the mixture of latex, water, and coagulant is heated to at least 287° F.

The latex amenable to this invention will comprise a resin which will generally contain from about 5 to about 30 weight percent combined butadiene, from about 40 to about 70 weight percent combined styrene, and from about 10 to about 40 weight percent combined acrylonitrile, the acrylonitrile and styrene being grafted onto the polybutadiene, and all weight percents being based on the total weight of the resin.

EXAMPLE I

Two ABS graft copolymers were made by the following receipes and conditions:

|  | Parts by weight | |
|---|---|---|
| Run No. | 1 | 2 |
| Water | 925 | 925 |
| Butadiene homopolymer latex [1] | 18.6 | 18.6 |
| Styrene | 53.0 | 61.9 |
| Acrylonitrile | 28.4 | 19.5 |
| "Dresinate" 554 [2] | 1.48 | 1.48 |
| NaOH | 0.5 | 0.5 |
| "Daxad" 15 [3] | 0.5 | 0.5 |
| $K_2S_2O_8$ | 0.5 | 0.5 |
| "Sulfole" 132 [4] | 0.35 | 0.35 |
| Temperature, ° F | 122 | 122 |
| Reaction time, hours | 11.5 | 10.7 |
| Conversion of both the acrylonitrile and styrene, percent | 84 | 88 |

[1] Firestone Tire and Rubber Comapny's FR S-2004 latex containing 60 weight percent solids based on total weight of the latex. The parts shown in the recipe are polybutadiene.
[2] Potassium salt of disproportionated rosin acid produced by Hercules Powder Company.
[3] Sodium alkylnaphthalene sulfonic acid.
[4] Tertiary dodecyl mercaptan.

Procedure (1) The latex, 740 parts of water, and half the soap ("Dresinate"), NaOH, and "Daxad" were charged to the reactor.

(2) The mixture was heated to 122° F. and half the potassium persulfate in 31 parts of water was added.

(3) The styrene, acrylonitrile, and "Sulfole" were mixed and added simultaneously with 154 parts of water containing the rest of the soap, NaOH, "Daxad," and potassium persulfate. In run 1 the addition of all the ingredients was uniform during the first 8 hours of the reaction period. In run 2 the addition of all the ingredients was completed at the beginning of the reaction period.

(4) At the end of the reaction period 2 p.h.r. (parts per 100 parts by weight of resin) of tri(nonylphenyl)phosphite antioxidant was added.

The pH of the polymer latex of run 1 was adjusted to 2 by addition of concentrated hydrochloric acid to coagulate the resin, thereafter 0.1 p.h.r. of a polyethyleneamine coagulation aid (Dow CE–46) was added, and the mixture was heated by direct contact with steam to 200° F. Thereafter, the mixture was filtered on cheesecloth to separate the solid resin which was then water washed.

The pH of a portion of the polymer latex of run 2 was adjusted to 2 by addition of concentrated hydrochloric acid to coagulate the resin. Thereafter, 0.1 p.h.r. of polyethyleneamine (Dow CE–46) was added. The mixture was then heated by direct contact with steam to a temperature of 287° F. Thereafter, the mixture was cooled to about 100° F., filtered on cheesecloth to separate the solid resin which was then water washed.

The physical properties (heat distortion temperature, hardness, flexural modulus, tensile strength, elongation, and impact strength) of the polymers of runs 1 and 2 were substantially the same. However, the nature of the polymer particles after coagulation, cooling, filtering, and washing, was widely divergent. The polymer particles recovered from run 1 were in the form of finely divided powder having an average particle diameter less than 150 microns whereas polymer particles recovered from run 2 (wherein the coagulation temperature was 287° F.) were granular in nature and had an average particle diameter greater than 2000 microns.

EXAMPLE II

Another latex was formed using the same recipe and conditions as run 1 of Example I.

The latex formed was divided into two portions. Both portions of the latex were adjusted to a pH of 5 by addition of concentrated hydrochloric acid. Thereafter, 0.1 p.h.r. of Dow CE–46 were added to both portions of the latex. Thereafter, one portion of the latex was heated by direct contact with steam to a temperature of 274° F. whereas the other portion was heated by direct contact with steam to a temperature of 345° F. Thereafter, both steam treated, coagulated portions were cooled to about 100° F., filtered on cheesecloth, and water washed. The polymer particle product of both portions was examined after the water washing step and it was found that the portion that was heated to a temperature of 274° F. was in a finely divided powder form wherein the particle size was less than 150 microns and the portion that was heated to 345° F. was in a granular form having a particle size of greater than 840 microns.

Reasonable variations and modifications are possible within the scope of this disclosure without departing from the spirit and scope thereof.

I claim:

1. In a method for coagulating an acrylonitrile-butadiene-styrene copolymer from an aqueous latex of said copolymer formed from polybutadiene onto which is grafted the acrylonitrile and styrene, said copolymer containing from about 5 to about 30 weight percent combined butadiene, from about 40 to about 70 weight percent combined styrene, and from about 10 to about 40 weight percent combined acrylonitrile, all weight percentages being based upon the total weight of the copolymer, the improvement comprising heating said latex of said copolymer to a temperature of at least 287° F. and for a period of time sufficient to cause the polymer particles obtained to have a size of at least 840 microns.

2. The method according to claim 1 wherein said heating is carried out at a temperature range of from 287 to about 350° F.

3. The method according to claim 2 wherein said heating is carried out for a time of from about 1 minute to about 1 hour during at least one of after the copolymer is coagulated and during the coagulation of the copolymer.

4. The method according to claim 1 wherein said heating is carried out by exposing said latex to steam.

5. The method according to claim 4 wherein the pH of the latex is adjusted to be acidic, thereafter polyethyleneamine is added in an amount sufficient to aid coagulation of the copolymer, and the latex is steam heated.

References Cited

UNITED STATES PATENTS 2,908,661   10/1959   Calvert.
3,006,872   10/1961   Benedict et al. _____ 260—3
3,015,642   1/1962    Bawn et al.

SAMUEL H. BLECH, *Primary Examiner.*

W. J. BRIGGS, SR., *Assistant Examiner.*

U.S. Cl. X.R.

260—876, 880